United States Patent
Honkola et al.

(10) Patent No.: US 8,287,697 B2
(45) Date of Patent: Oct. 16, 2012

(54) PYROLYSIS METHOD IN CONNECTION WITH A BOILER AND A PYROLYSIS APPARATUS

(75) Inventors: Timo Honkola, Kangasala (FI); Pasi Salonen, Orivesi (FI); Jani Lehto, Tampere (FI)

(73) Assignee: Metso Power Oy, Tampere (FI)

( * ) Notice: Subject to any disclaimer, the term of this patent is extended or adjusted under 35 U.S.C. 154(b) by 14 days.

(21) Appl. No.: 12/414,119

(22) Filed: Mar. 30, 2009

(65) Prior Publication Data
US 2009/0242377 A1  Oct. 1, 2009

(30) Foreign Application Priority Data
Mar. 31, 2008 (FI) .................................. 20085265

(51) Int. Cl.
*C10B 49/22* (2006.01)
(52) U.S. Cl. ............... 201/12; 201/31; 202/99; 422/145
(58) Field of Classification Search .................... 201/12, 201/16, 31; 202/99, 108, 134, 135, 269; 422/145; 165/104.18
See application file for complete search history.

(56) References Cited

U.S. PATENT DOCUMENTS

| | | | | |
|---|---|---|---|---|
| 2,797,908 A | * | 7/1957 | Zubrzycki | 34/588 |
| 3,476,649 A | * | 11/1969 | Ledent | 201/12 |
| 3,535,209 A | * | 10/1970 | Ledent | 201/27 |
| 3,921,307 A | * | 11/1975 | Marek et al. | 34/363 |

(Continued)

FOREIGN PATENT DOCUMENTS
CN            1786111           6/2006

(Continued)

OTHER PUBLICATIONS

European Search Report in counterpart European Application 09397507 issued Dec. 22, 2009.

(Continued)

*Primary Examiner* — Jill Warden
*Assistant Examiner* — Joye L Woodard
(74) *Attorney, Agent, or Firm* — Connolly Bove Lodge & Hutz LLP

(57) ABSTRACT

A pyrolysis apparatus comprises a furnace (1) operating by fluidized bed combustion, a pyrolyzer (4) and flow paths, which connect the furnace (1) and the pyrolyzer (4) for arranging the circulation (C) of carrier material of the fluidized bed combustion between the furnace and the pyrolyzer. The apparatus also comprises a supply inlet (14) for supplying fuel to be pyrolyzed to the pyrolyzer (4), fluidizing gas supply means (5) arranged in the pyrolyzer for fluidizing the mixture of carrier material and fuel, and an outlet (6) for taking condensible gaseous substances separated from the fuel to be pyrolyzed out of the pyrolyzer (4), and a condenser for condensing the condensible gaseous substances. The carrier material circulation is arranged at the furnace (1) by a cocurrent principle along the flow path of hot flue gases, which comprises a separator (3) located higher than the pyrolyzer (4), which separator is arranged to separate carrier material from flue gases, while the circulation also comprises a connecting conduit (11) between the separator (3) and the pyrolyzer (4) for moving the carrier material by gravity to the pyrolyzer (4), and a return path (12) between the pyrolyzer (4) and the furnace (1) for returning the carrier material to the furnace (1). The outlet (6) is arranged in the chamber formed by the pyrolyzer (4) in its upper part in a space above the fluidized mixture of carrier material and fuel in order to remove the condensible gaseous substances from the pyrolyzer.

12 Claims, 3 Drawing Sheets

U.S. PATENT DOCUMENTS

| | | | |
|---|---|---|---|
| 4,274,941 A * | 6/1981 | Janssen et al. | 60/39.12 |
| 4,430,195 A * | 2/1984 | Oltrogge | 208/410 |
| 4,437,416 A | 3/1984 | Ishii et al. | |
| 4,891,459 A | 1/1990 | Knight et al. | |
| 5,728,271 A | 3/1998 | Piskorz et al. | |
| 5,792,340 A | 8/1998 | Freel et al. | |
| 6,814,940 B1 | 11/2004 | Hiltunen et al. | |

FOREIGN PATENT DOCUMENTS

| | | |
|---|---|---|
| CN | 1978591 | 6/2007 |
| DE | 282702 | 9/1990 |
| EP | 513051 | 11/1992 |
| EP | 0895807 A2 | 2/1999 |
| FI | 117512 | 11/2006 |
| WO | WO-94/11674 A1 | 5/1994 |
| WO | WO-9706886 | 2/1997 |
| WO | WO-02083816 | 10/2002 |
| WO | WO-03106590 | 12/2003 |
| WO | WO-2005/021686 A1 | 3/2005 |
| WO | WO-2008029689 | 3/2008 |

OTHER PUBLICATIONS

English language translation of the Finnish Search Report issued in related Finnish Application No. 20085265 on Feb. 23, 2009.

* cited by examiner

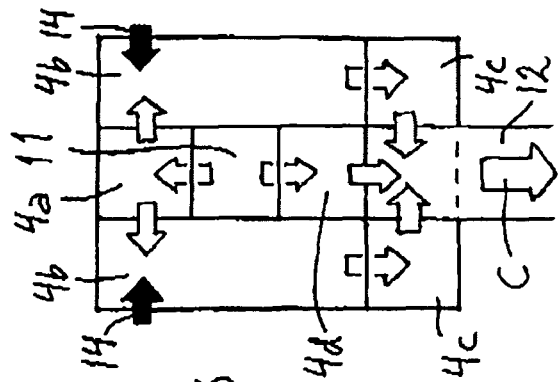
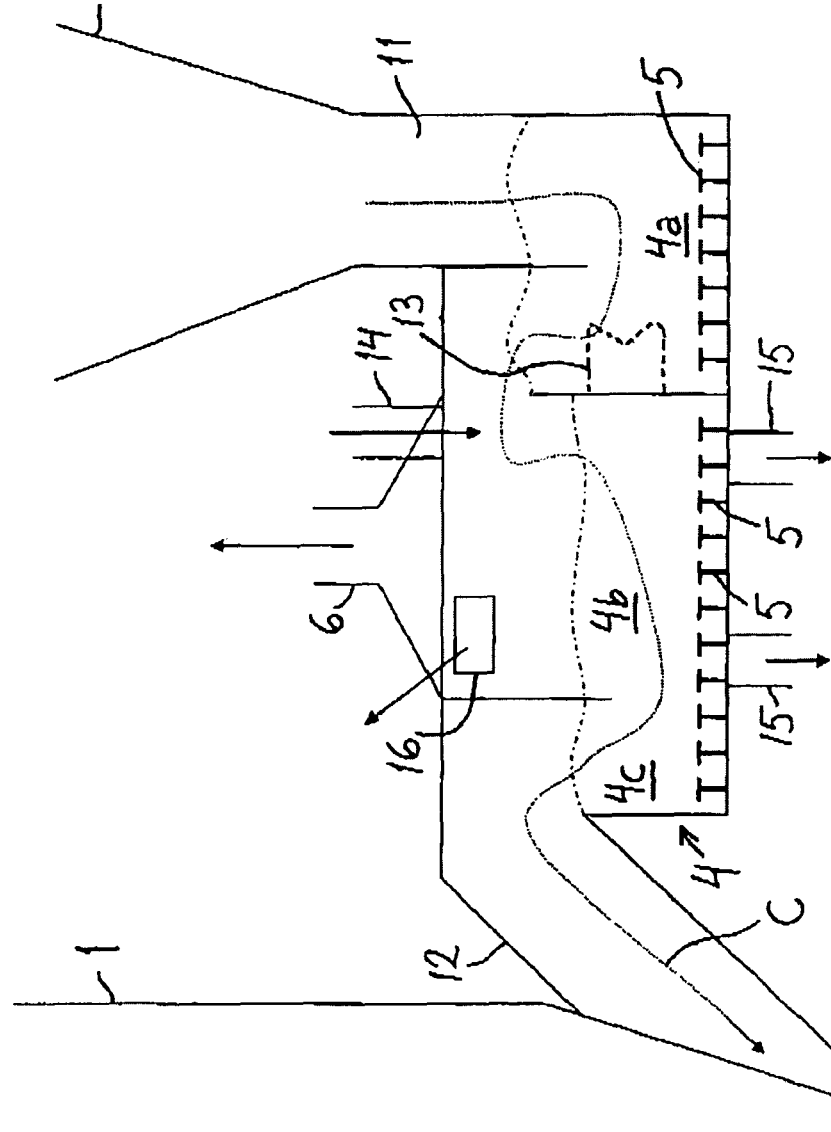

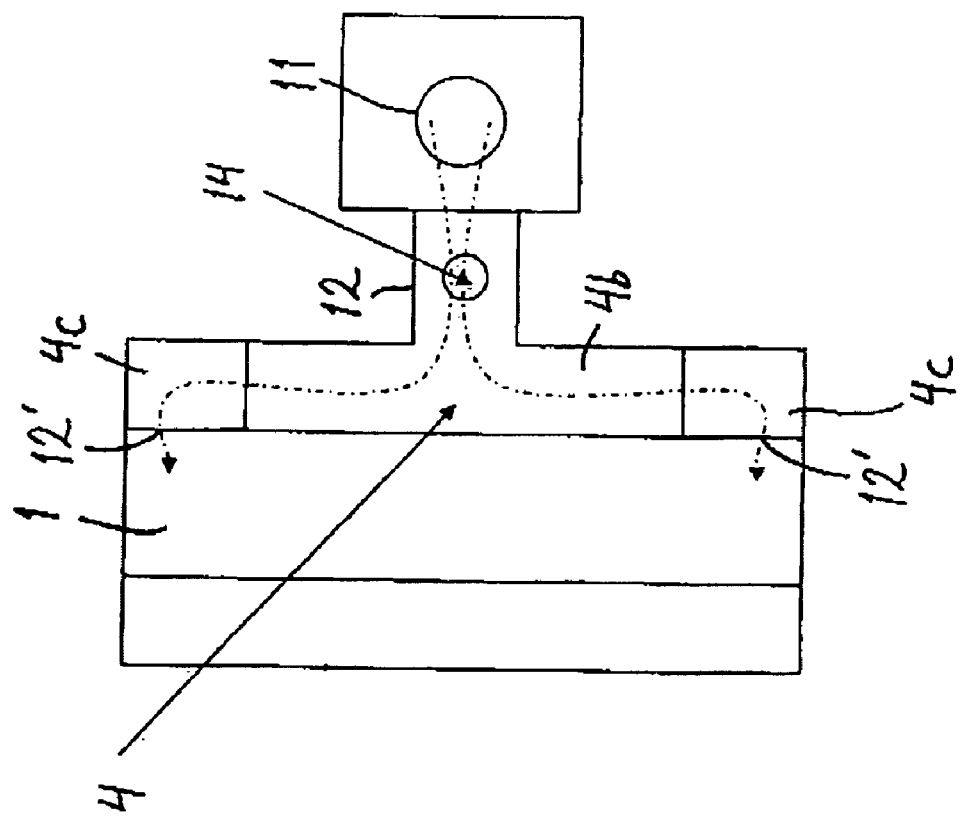
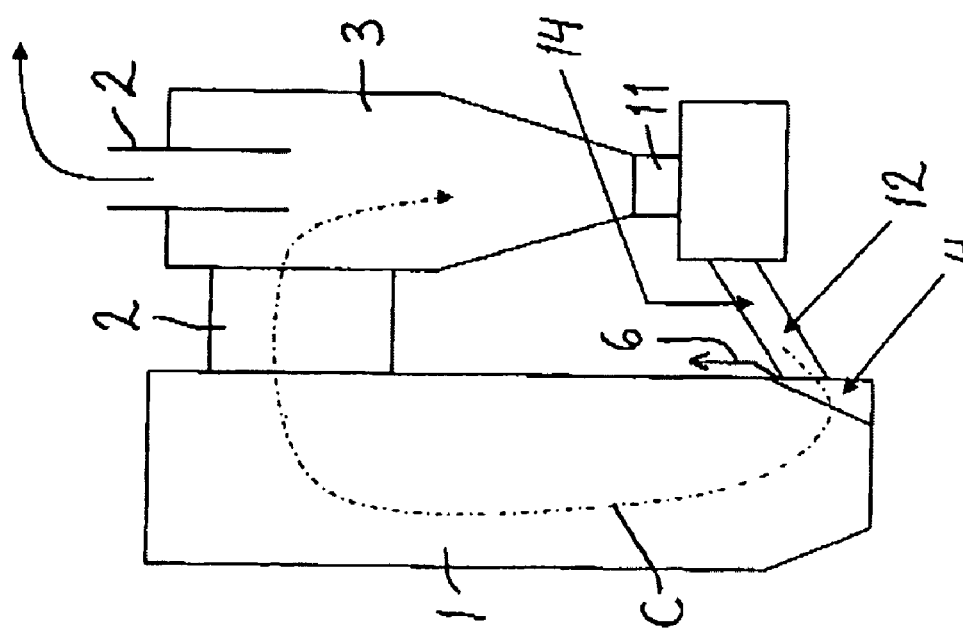

PYROLYSIS METHOD IN CONNECTION WITH A BOILER AND A PYROLYSIS APPARATUS

DESCRIPTION

1. Technical Field

The invention relates to a pyrolysis method in connection with a boiler, in which method a carrier material received from a fluidized bed combustion process of the boiler is circulated back to the combustion process via a pyrolysis process, where it is mixed with the solid fuel, of which are formed condensible gaseous substances by means of heat released by the hot carrier material, which gaseous substances are separated from a gas flow coming from the pyrolysis process in liquid form as so-called pyrolysis oil. The invention also relates to a pyrolysis apparatus which comprises a furnace operating by fluidized bed combustion, a pyrolyzer and flow paths, which connect the furnace and the pyrolyzer for arranging circulation of carrier material of the fluidized bed combustion between the furnace and the pyrolyzer, in addition to which the apparatus comprises a supply inlet for supplying fuel to be pyrolyzed to the pyrolyzer, fluidizing gas supply means arranged in the pyrolyzer for fluidizing a mixture of carrier material and fuel, and an outlet for taking condensible gaseous substances that have separated from the fuel to be pyrolyzed out of the pyrolyzer, and a condenser for condensing the condensible gaseous substances.

2. Background

Pyrolysis refers to conversion of fuel in inert conditions and high temperature into gaseous form, which during condensation forms oily liquid that comprises different organic compounds. Inert conditions in connection with pyrlysis refer to oxygen-free conditions, wherein combustion of fuel is avoided. Tar manufacture, "tar distillation" is one example of a pyrolysis process known for ages.

In a pyrolysis process fuel is pyrolyzed, the gaseous compounds formed in the reaction are separated from carbonization residue, and they are condensed into pyrolysis oil, which may be used, for example, as fuel or it may be processed further into different chemicals. Production of pyrolysis oil from different bio-based, for example wood-based fuels has been studied with the purpose of replacing coal and heavy fuel oil with it. One advantage of pyrolysis oil is its easy transportation in comparison to biomass that is difficult to transport, when taking into account the energy content of fuels.

Examples of development of pyrolysis processes include several patent publications, for example, U.S. Pat. Nos. 4,891,459; 5,728,271; EP 513051 and 6,814,940. The pyrolysis technique disclosed in these publications is based on the fluidization of solid, for example biomass-based fuel with inert fluidizing gas at approx. 400 to 600° C., possibly in the presence of fluidized bed material. The fuel to be pyrolyzed in a reactor is supplied to the lower part of the reactor, from where it flows upwards with fluidizing gas. The bed material and carbon residue are separated from the gases flowing out of the reactor by cyclones or corresponding separators, as shown, for example, in publication EP 513051 (Ensyn Technologies Inc.), which corresponds to, inter alia, U.S. Pat. No. 5,792,340.

Publication WO 02/083816 discloses pyrolysis in a fluidized bed reactor, where the aim is to keep the bed dense in order to intensify heat transfer from carrier particles (sand) to fuel particles. The actual reactor is a riser, which is surrounded by carrier particles in return circulation, from which particles the combustible residue formed in them in the pyrolysis reaction is being burned off.

Publication WO 97/06886 (Biomass Technology Group B.V) discloses the circulation of heat treated material inside a reactor by means of a special rotating, vertical, upwards-expanding vessel. One application is the pyrolysis of materials. The publication WO 03/106590 (Biomass Technology Group B.V.) discloses a two-phase process, where the first phase comprises mixing of pyrolyzed particles and hot carrier particles in a mixing chamber, and the second phase comprises the separation of pyrolysis gases from a downward-flowing mixture in a reactor chamber.

According to FIG. 8 of U.S. Pat. No. 5,792,340 (Ensyn Technologies, Inc), carbonization residue, and incondensible gases are burned with carrier particles (e.g. sand) in a special reactor, from where the heated carrier particles are directed via a cyclone separator and circulation pipe to a pyrolysis reactor, where the reaction takes place in an upwards flow. The temperature of the carrier particles can be adjusted by returning a part of the carrier particles exiting the pyrolysis reactor directly back without heating. The mass ratio of the carrier particles and fuel in this process is 12:1-200:1.

The patent FI 117513 (Valtion teknillinen tutkimuskeskus, Technical Research Centre of Finland) discloses a method, where a pyrolyzer is placed in connection with a fluidized bed boiler burning solid fuel, which pyrolyzer utilizes in the pyrolysis the energy content of the hot inert bed material (sand) of the fluidized bed boiler. Different fuel is fed to the pyrolyzer than to the fluidized bed boiler. The fuel energy need of the pyrolyzer is at the most 50% of the fuel flow of the combustion boiler, advantageously 25% at the most. The examples of the publication show a combustion boiler, which is a bubbling fluidized bed boiler (BFB), where bed material is taken from the bottom and directed via a supply pipe to the lower part of the pyrolyzer, where the fuel and fluidizing gas are also supplied. The pyrolyzer operates as a circulating mass fluidizing reactor, where the bed material is separated by a cyclone from product gas and returned to the combustion boiler via a return pipe. The patent mentions only in passing that the boiler may be a circulating fluidized bed boiler (CFB).

In the above-mentioned patent pyrolysis takes place by a cocurrent flow principle and different fuels are supplied to the pyrolyzer and the combustion boiler, and the fuel power of the combustion boiler is kept higher than the fuel power of the pyrolyzer. The basis for this is, inter alia, a better operating efficiency and that the heat received from the combustion boiler can be used, inter alia, for drying the fuel of the pyrolyzer.

The basis for integrating the pyrolyzer to the combustion boiler and for supplying two fuels according to the above-mentioned patent is that the heat content of the coke and incondensible gases is insufficient for the internal energy need of the pyrolysis process when the fuel of the pyrolysis process requires a great deal of drying. The additional energy is thus received from the combustion boiler, where it is possible to burn a different fuel, which can be selected e.g. on the basis of energy production.

The above-described method requires a separator (cyclone) of product gas and bed material after pyrolysis, as well as pipes for supplying bed material to the pyrolyzer and for returning it to the combustion boiler.

SUMMARY OF DISCLSOURE

With the method according to the invention the circulation of inert carrier material is simpler and it may utilize the movement of material by gravity. In addition, due to the cross flow of fuel and carrier material and the great heat content of the carrier material, it is possible to produce good quality pyrolysis oil with a good efficiency also in such processes where all or almost all raw fuel is supplied to the pyrolyzer. The invention utilizes the material circulation of a circulating fluidized bed boiler. The coke created in the pyrolysis process, as well as other combustible materials mixed in the carrier material are burned in the combustion process in the furnace of the circulating fluidized bed boiler. A part of the energy created in the combustion process is taken out and a part is transferred to the carrier material, which is returned to the pyrolyzer in the circulation of the circulating fluidized bed boiler. The inert carrier material circulates in the circulating fluidized bed boiler like a normal bed material, in which case it receives heat efficiently in the combustion process of the boiler while moving upwards through the hot combustion zone and cocurrently with flue gases, and after that releases it to the pyrolysis process. The pyrolysis process is arranged preferably in the so-called sand seal of the circulating fluidized bed boiler.

The process comprises three partial processes in total:
  a pyrolysis process, where the evaporating components are separated from fuel in oxygen-free conditions by means of heat brought by a hot carrier material,
  a further processing process for product gases obtained in this way, where pyrolysis oil is separated from incondensible gases, and
  a combustion process, where the combustible by-products of the pyrolysis process are burned (pyrolysis residue and the incondensible gases possibly returned from the further processing process of gas) in oxygenous conditions in the presence of the carrier material.

Among the above-mentioned partial processes, the pyrolysis process and the combustion process belong to the circulation of the bed material, i.e. carrier material of the circulating bed boiler.

According to an advantageous embodiment the fuel entering the pyrolyzer is dried by the waste heat of the process, such as heat from flue gas, low pressure steam or pyrolysis product gas.

If desired, the supply of fuel may be arranged mainly through the pyrolyzer. Thus, to the boiler that burns pyrolysis residue (coke and other combustible components) and incondensible gases, an amount of additional fuel that has smaller energy content than those mentioned above, e.g. 10% at the most of the energy content of the above-mentioned substances, is supplied. The energy produced by the boiler therefore originates almost solely in by-products of the production of pyrolysis oil. It is also possible to arrange the supplies of fuel to the pyrolysis process and the combustion process in a conventional manner, by using the same or a different fuel.

In a pyrolyzer arranged in the sand seal of a circulating fluidized bed boiler the bed material of the boiler is fluidized with an inert fluidizing gas at the same time as it moves towards the furnace of the boiler in the circulation of the circulating fluidized bed boiler. The bed material moves from the combustion process by gravity to the pyrolysis process and also the fuel to be pyrolyzed is dropped advantageously from above the fluidized surface to the pyrolysis process. The fuel and the bed material are carried via the pyrolysis process towards the combustion process and the fluidizing gas exits from above the fluidized mixture of bed material and fuel together with the product gas created in pyrolysis. A special separator is not needed, but gases are separated from solid material in the actual pyrolysis process. When the bed material and fuel are moved transversely in relation to the gas flow, the gases created in the pyrolysis are in contact only for a short period of time with the fuel, the fluidized bed material and the pyrolysis residue (coke).

The pyrolyzer can easily be integrated as a part of the fluidized bed boiler by utilizing a sand seal, and it may also be constructed to existing circulating fluidized bed boilers by using known sand seal solutions in them. The supply of fuel may be arranged to take place at least party through a pyrolyzer and in some cases it is necessary to supply only auxiliary fuel to the actual combustion process in order to satisfy the need of additional energy, such as the energy required for start-up.

The invention comprises other advantageous embodiments related mainly to the structural solutions of the pyrolyzer, which embodiments will be discussed later.

BRIEF DESCRIPTION OF DRAWINGS

In the following, the invention will be described in more detail with reference to the appended drawings, in which
FIG. 2 shows in more detail the flow of bed material and fuel in a pyrolyzing process,
FIG. 3 shows a horizontal cross-section of one structure of a pyrolyzer, by means of which the process of FIG. 2 may be implemented,
FIG. 4 shows schematically a circulating fluidized bed boiler, where the pyrolyzer is connected to a furnace,
and
FIG. 5 shows a horizontal cross-section of the boiler of FIG. 4.

DESCRIPTION OF BEST AND VARIOIUS MODES FOR CARRYING OUT DISCLOSURE

Figure 1:
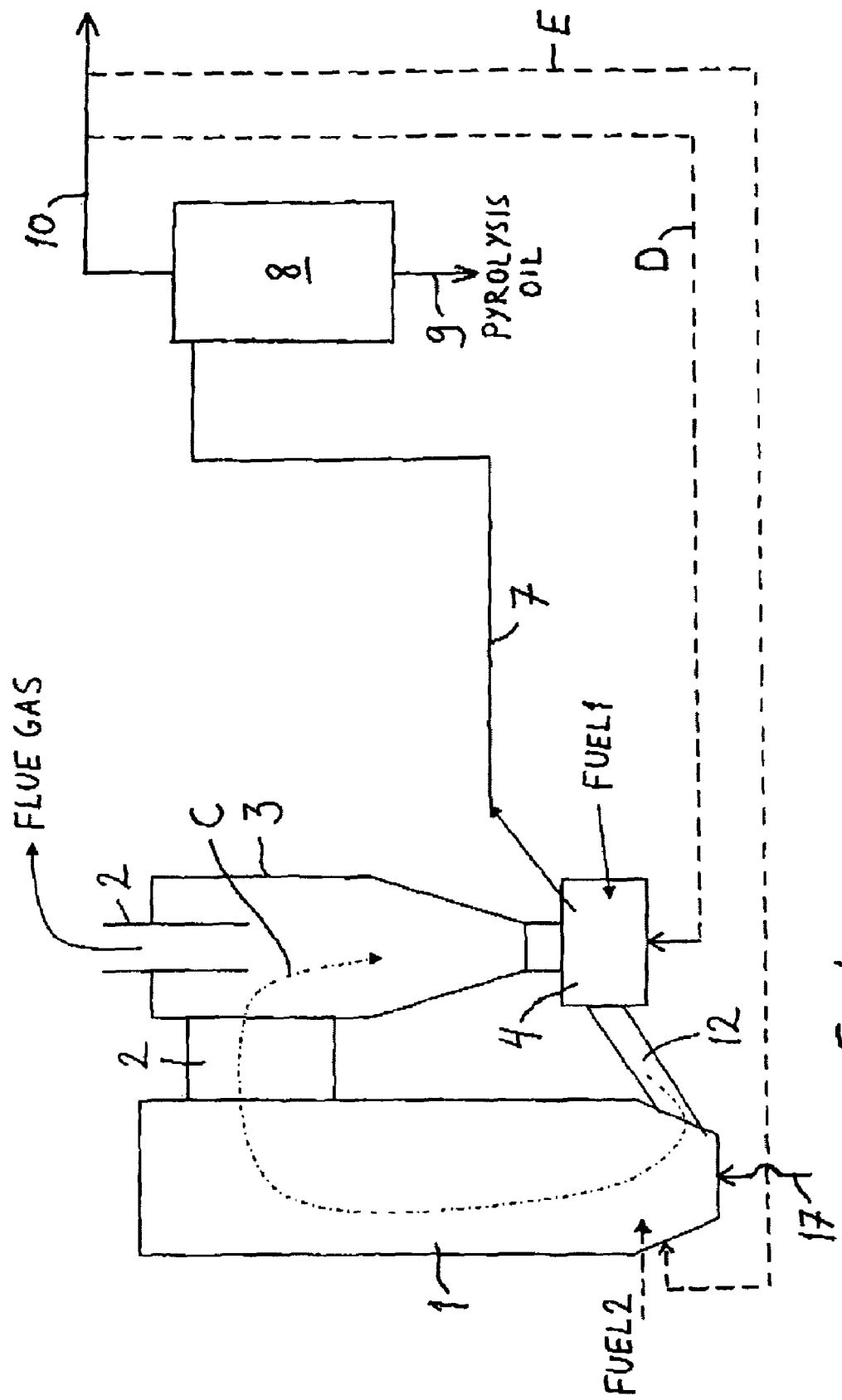
FIG. 1 shows schematically the entire process, which comprises a circulating fluidized bed boiler provided with a pyrolyzer and the processing of product gases.

FIG. 1 shows schematically a process, which utilizes a circulating fluidized bed boiler (CFB), where inert bed material composed of solid particles, typically sand or other mineral-based material, is fluidized in a furnace 1 with fluidizing air 17, which at the same time at least partly provides the oxygen required by a combustion process. The bed material is later also called carrier material, because it does not take part in the actual reactions, but operates mainly as a material that recovers, transfers and emits heat. The furnace may also comprise other supply points for combustion air, which are not shown in more detail. A flue gas channel 2 exits the furnace 1, which channel comprises a cyclone operating as a separator 3, which separates the bed material to return circulation, where the bed material flows via the pyrolyzer 4 and return channel 12 back to the furnace 1. As a result of the combustion process taking place in the furnace, the boiler produces energy outwards in the form of steam, which may in turn be used for producing electricity and heat. Parts relating to the steam production of the boiler are not shown, as they are not a part of the invention.

In FIG. 1 the circulation of bed material (dotted line C) comprises as one part a pyrolysis process, where it is possible to pyrolyze fuel that is suitable for producing pyrolysis oil. The pyrolysis process is especially suitable for solid, bio-based fuels, such as wood chips, sawdust, straw, different logging waste and other bio-based waste, etc. When the material to be pyrolyzed is called fuel, it is important to keep in mind that the material does not burn in the pyrolysis process, but emits combustible gaseous materials, which after condensation into a liquid can be recovered, stored, transferred and burned elsewhere in order to utilize their energy content.

The pyrolysis process comprises a pyrolysis reactor, i.e. a pyrolyzer 4, which in the bed material circulation C is located between the separator 3 and the furnace 1. It is a substantially closed chamber, which comprises the supply of fuel, means for supplying fluidizing gas and the removal of organic gaseous material created in the pyrolysis and fluidizing gas. The gaseous materials are directed via line 7 to a condenser 8, where pyrolysis oil is condensed from them in one or more phases, which oil is taken out via line 9. Incondensible gases are removed via line 10 to further processing. These gases may after the scrubber be refused as fluidizing gas of the pyrolyzer (dashed line D) or preferably as fuel for the furnace 1 of the circulating fluidized bed boiler (dashed line E).

The pyrolysis process Is continuous, and it utilizes the energy content of the bed material coming from the furnace 1. In circulation C the bed material receives heat energy from the combustion process of the furnace 1 and releases it to the pyrolysis process of the pyrolyzer 4. The pyrolysis takes place at a temperature of approximately 400 to 600° C. The combustion process in turn utilizes the combustible, carbon-rich pyrolysis residue entering the furnace 1 along the return channel 12 together with the bed material, i.e. the material that is left of the fuel when the product gas has separated from it In pyrolysis. The fuel supply of the furnace may, if necessary, take place solely or almost solely via the pyrolyzer 4 (arrow "FUEL1"). Undesired components may be removed from the fuel in the pyrolysis process and the result Is mainly coke, which is suitable for a fuel of the combustion process. Thus, the pyrolysis process in a way operates also as the refining process for the fuel supplied to the furnace. It is, however, possible that fuel (FUEL2) is supplied from the outside to the furnace 1 as well, in which case it is not maintained solely by the fuel produced by the pyrolyzer 4.

The bed material flows in the combustion process concurrently upwards with the flue gases to the separator 3 and thus simultaneously rises above the pyrolyzer 4. The bed material circulates outside the furnace by means of gravity from the separator via the pyrolyzer back to the furnace. The bed material enters the pyrolyzer from above and moves together with the fuel towards the furnace. The fluidizing gas and the product gas created in the pyrolysis are removed from above the bed material and fuel for further processing (condensation).

A suitable inert gas is used as fluidizing gas, such as incondensible gases created in pyrolysis, circulation gas of the boiler (flue gases to be returned to the process), from which oxygen has been burned off, or some other inert gas, such as nitrogen. Fluidizing gas is dried waterless, if necessary, before it is supplied to the pyrolyzer.

If the fuel of the pyrolysis process is moist, as bio-based fuel often is, it is advantageous to dry it before pyrolysis so that the heat of the bed material will be used for pyrolysis reactions and the creation of a water phase in the pyrolysis oil can be avoided. Drying is advantageous to carry out in a low temperature, below 170° C., i.e. below the starting temperature of pyrolysis. For the drying, it is possible to use flue gas of the combustion boiler 1, low-pressure steam or heat received from cooling the product gas. Since coke is burned in the furnace 1, the flue gas produced by the boiler is quite dry, and it can be utilized for direct drying of the fuel, especially when fuel is supplied solely or mainly via the pyrolyzer 4.

If the pyrolyzer is used as the only energy source of the combustion process, the water content of the flue gases can therefore be reduced significantly, because the carbon content of the pyrolysis residue is high. If the combustion is accomplished by using so-called oxygen combustion, it is possible to receive nitrogen-free, pure carbon dioxide, which is easy to recover.

FIG. 2 shows the flow of material in a pyrolysis process. The figure shows the vertical cross-section of a pyrolyzer 4 made in the so-called sand seal of a circulating fluidized bed boiler in such a manner that the sections that are successive in the flow direction of bed material are shown in one plane. In practice, the sections may follow each other so that material does not flow in the same direction all the time, but changes its direction in horizontal plane depending on the placement of the sections. The sections are placed substantially in a closed chamber. From the cyclone operating as a separator 3 the bed material falls along a dipleg 11 directly down to the inlet section 4a of the pyrolyzer, from where it exits through an opening between the intermediate wall and the ceiling of the chamber to the pyrolysis section 4b. This intermediate wall bordering the inlet section extends higher that the lower edge of the dipleg 11, in which case a first gas lock is formed in the inlet section 4a. To the beginning of the pyrolysis section 4b, in the flow direction of the bed material, fuel to be pyrolyzed is supplied from above via a supply inlet 14 arranged in the ceiling of the chamber, i.e. the fuel drops at the supply point by gravity onto the bed material. The bed material and the fuel gradually changing Into coke and other pyrolysis residue in the pyrolysis flows through the pyrolysis section 4a horizontally and enters the outlet section 4c of the pyrolyzer through an opening between the intermediate wall bordering the pyrolysis section 4b and the bottom of the chamber. From the outlet section 4c the material can exit over a threshold to a return conduit 12 directed diagonally downwards to the furnace 1. The threshold is located higher than the lower edge of the previous Intermediate wall, and thus another gas lock is formed, i.e. structurally the pyrolyzer 4 is a so-called double gas lock.

The flow of the bed material from above from the cyclone down to the furnace takes place by gravity and on the horizontal portion the material flows carried by the fluidizing gas through the pyrolyzer 4. Gravity is also a requirement for the transfer of material through the pyrolysis phase. The bed material falls by its own weight to the pyrolyzer 4 and leaves back to the furnace 1 by means of gravity (downwards along the return conduit 12). The bed material and fuel are therefore carried in a fluidized form in the pyrolyzer. The material is fluidized in the pyrolyzer 4 from below with inert fluidizing gas blown via the bottom of the chamber and fluidization exists in every section. In the pyrolysis reactions the gases separated from the fuel and the fluidizing gas are carried above the bed material and they are removed from the top. On the bottom of the chamber, fluidizing nozzles in each section are marked with reference 5, and an outlet for gases created in pyrolysis and fluidizing gases, which outlet is on the ceiling of the chamber at the pyrolysis section 4b, is marked with reference 6. The fluidizing rates can advantageously be adjusted independently in different sections 4a, 4b and 4c.

The flows of the fluidizing gas and the fuel to be pyrolyzed are thus crosswise in such a manner that the main flow direction of the fuel and the bed material is horizontal, and the main flow direction of the fluidizing gas and the gases separated in pyrolysis is vertical from bottom to the top. The elongated pyrolysis zone formed by the pyrolysis section 4b comprises several sequential fluidizing nozzles 5. The fuel particles therefore come into contact with fresh fluidizing gas at the same time as they are continuously in contact with hot bed material while flowing through the pyrolysis section 4b. The residence time of fuel particles in the process with fresh fluidizing gas and hot bed material therefore becomes longer that the contact time of product gases with the fuel/pyrolysis residues of the process. The fuel particles can be kept in conditions advantageous to pyrolysis for a long time determined by the length of the pyrolysis zone and the flow rate of material, whereas the gases created in pyrolysis, i.e. reaction products are released in a clearly shorter time. Even large fuel particles have time to pyrolyze, but the gases created from them are not in the fluidized mixture of bed material and fuel/pyrolysis residue for as long period of time, when comparing the residence times of fuel particles and individual gas molecules.

When fuel is brought to the pyrolysis section 4b from above onto the bed material to be fluidized, a good mixing of bed material and fuel is achieved. The hot bed material drops from the inlet section 4a over the intermediate wall to the same point with fuel in the beginning of the pyrolysis section. The mixing can still be improved by arranging the fluidizing rate in the beginning of the pyrolysis section 4b greater than elsewhere in the pyrolysis section.

The flow route of material is shown by a dotted line and the upper surface of the bed material in different sections by a dotted and dashed line. In addition, the bottom of the chamber at the pyrolysis section 4b comprises outlets 15 of rough, unfluidized bottom ash and other unfluidized particles, and the upper part of the chamber at the end of the pyrolysis section, for example the upper part of the side wall of the pyrolysis section 4b, comprises an outlet 16 for the light substances (surface ash) possibly accumulating onto the fluidized bed material layer.

FIG. 2 shows, sequential sections, spread into one plane. In practice, the material may make 90 degree turns, i.e. the sections of the pyrolyzer may be angled in relation to each other, and not directly one after the other. This kind of a solution decreases the space required for the pyrolyzer 4 and also enables the use of bypass routes for hot bed material. Thus, it is possible to direct only a part of the bed material via the pyrolysis section and a second part past the pyrolysis process to the furnace 1. FIG. 3 shows a horizontal cross-section of such a structure. The dipleg 11 comes to the middle of the pyrolyzer chamber 4, from where the material flow parts towards opposite sides, to the Inlet section 4a and the bypass section 4d. From the inlet section 4a the bed material parts to two pyrolysis sections 4b. In the pyrolysis sections the pyrolysis takes place as shown in connection with FIG. 2, and the fuel supply to these is shown by the arrow 14. In the bypass section 4d the bed material is fluidized, but it does not comprise fuel supply. The pyrolysis sections 4b are followed by outlet sections 4c, from where the material moves to the beginning of the return conduit 12, which receives a material flow from the bypass section 4d as well. From here the bed material, both the one entered through pyrolysis and the one that has bypassed it, continues via the return conduit 12 to the furnace. If the amount of bed material is greater than what is needed for pyrolysis, by means of the bypass it is possible to control the amount of bed material entering pyrolysis, the bed material/fuel ratio and at the same time the pyrolysis temperature.

In the structure of FIG. 3 the dipleg 11 comes to the middle of the chamber formed by different sections, the inlet section 4a is located behind the dipleg when seen from the furnace 1 and the bypass section 4d on the side of the furnace. The pyrolysis sections 4b are located symmetrically on both sides of the above-mentioned sections with their longitudinal directions towards the furnace 1. The placement of intermediate walls bordering the sections corresponds in principle to the one shown in FIG. 2, and the flow of material over and under the intermediate walls is shown by arrows. The placement of sections can be of another kind, depending on the space requirement.

FIGS. 4 and 5 show another embodiment, where the pyrolyzer sand seal is placed to the side of the furnace in the circulating fluidized bed boiler. FIG. 4 shows that the pyrolysis, section 4b follows after the conduit channel 12, between two gas seals here as well, as in FIG. 2. The first gas seal is formed by means of a dipleg 11 from the cyclone and the threshold of the return conduit 12. FIG. 5 shows the structure in a horizontal cross-section. The return conduit 12 ends in the middle of the pyrolysis section 4b. The pyrolysis section 4b extends transversely to, the inlet direction of bed material, and both of its ends comprise outlet sections 4c, which are bordered by intermediate walls which form the second gas locks (the material enters the outlet section 4c from the pyrolysis section 4b from below, for example below the intermediate wall separating the sections in the upper part, and exits from the outlet section 4c to the furnace 1 via an upper return outlet 12', which may be in the common wall of the pyrolyzer 4 and the furnace 1). The fuel is supplied from above to the return conduit 12 to the bed material, from where it is carried with the bed material to the middle of the pyrolysis section 4b and parts into two different material flows. The pyrolysis section 4b and the outlet sections 4c comprise fluidization and the removal of gases created in pyrolysis by the same principle as in FIG. 2. The advantages of the embodiment of FIGS. 4 and 5 are a compact structure, because the elongated pyrolysis section 4b is here placed in the direction of one wall of the furnace 1. In addition, fuel can be supplied from two different points (outlet sections 4c) to the furnace 1, which improves the distribution of fuel to the combustion process. Even though material is fluidized in the pyrolyzer, even here the total mass flow through the pyrolyzer 4 is caused by gravity.

The supply of hot bed material to the pyrolysis process can also be phased. The pyrolyzer may, for example, be arranged with several pyrolysis sections, each of which is supplied with more bed material. If in the beginning only a part of the required bed material is brought into contact with fuel, the pyrolysis can be started at a relatively low temperature, and when the pyrolysis has advanced, the rest of the bed material is supplied at one time or in phases to the fuel and the pyrolysis temperature can therefore be raised towards the end.

In addition, the temperature of the pyrolysis process can be adjusted by a heat exchanger placed in the pyrolyzer 4. The heat exchanger placed in the inlet section 4a is marked by number 13 in FIG. 2.

According to the invention, as fuel for the entire circulating fluidized bed boiler, it is possible to use fuel from only the pyrolysis process (FUEL1, FIG. 1), which transforms in the pyrolysis process into coke used by the furnace and to other combustible pyrolysis residues. It is, however, possible to arrange a part of the fuel supply for the furnace in another manner, also in such a manner that the furnace receives its energy mostly from fuel supplied directly there (FUEL2, FIG. 1) and not through the pyrolysis process. If the pyrolyzer is dimensioned to respond mainly to the energy need of the furnace, the energy content of the additional fuel of the furnace, i.e. the auxiliary fuel is only a small part, preferably at the most 10% of the energy content of the fuel entering with bed material and possibly with the incondensible gases. This additional fuel may also be a different fuel that the one supplied to the pyrolysis process. Additional fuel may be required especially in connection with start-up of the process to heat the bed material in the furnace to a temperature required by pyrolysis. It is advantageous to arrange the furnace 1 with a separate supply of fuel also for such cases that the circulating fluidized bed boiler is used without pyrolysis, in which case the pyrolyzer 4 is used like an ordinary sand seal without fuel supply.

When calculated as mass, there is a multiple amount of circulating bed material than fuel to be supplied to pyrolysis. A suitable mass flow ratio is 20:1, but the ratio may vary on both sides of this value.

The pyrolyzer is easy to arrange in place of a sand seal in existing circulating fluidized bed boilers as well. Thus, the sand seal is dimensioned large enough due to a large fuel flow. In some cases there may be more than one of the return conduits 12 of FIG. 2 to ensure the even distribution of fuel in the furnace.

It is also possible to arrange two or more pyrolyzers in one boiler. Thus, the circulating fluidized bed boiler is arranged with a corresponding number of cyclones, which separate the bed material from flue gases for the pyrolyzer.

The invention claimed is:

1. A pyrolysis method in connection with a boiler, comprising:
   receiving a carrier material from a fluidized bed combustion process in a furnace of the boiler,
   circulating said carrier material back to the fluidized bed combustion process via a pyrolysis process,
   mixing said carrier material in the pyrolysis process with solid fuel,
   forming condensable gaseous substances of said solid fuel by means of heat released by the hot carrier material and by fluidization,
   separating said gaseous substances from a gas flow coming from the pyrolysis process in liquid form as so-called pyrolysis oil,
   said method further comprising:
   allowing the carrier material to flow in the combustion process concurrent with flue gases,
   separating the carrier material after the combustion process from the flue gases with a separator,
   feeding the carrier material between the separator and the combustion process by gravity to the pyrolysis process,
   performing said pyrolysis process in a pyrolyzer chamber which is bordered by the furnace of the circulating fluidized bed boiler in such a manner that the carrier material and the fuel part from the middle of the pyrolyzer chamber into two different material flows towards both ends, and the carrier material, coke and other combustible materials mixed with the carrier material are returned from both ends of the pyrolyzer chamber via return outlets to the furnace,
   removing the condensable gaseous substances from above the mixture of carrier material and fuel in said pyrolyzer chamber, and
   forming gas locks between the separator and the combustion process by means of the carrier material that is fed by gravity by feeding the carrier material in a first gas lock before the pyrolyzer chamber through an inlet that is located in a lower position than an outlet succeeding the inlet, and in second gas locks in both ends of the pyrolyzer chamber through inlets that are located in lower positions than said return outlets succeeding the inlets.

2. The method according to claim 1, wherein in the pyrolysis process the carrier material and the fuel flow transversely through the pyrolysis process in relation to the flow direction of fluidizing gas.

3. The method according to claim 2, wherein the carrier material and fuel move mainly horizontally through the pyrolysis process, the fluidizing gas is supplied from below them, and the condensable gaseous substances exit with the fluidizing gas from above them.

4. The method according to claim 3, wherein fuel is supplied from above to the beginning of the pyrolysis process.

5. The method according to claim 1, wherein most of the energy of the fuel of the combustion process originates in the pyrolysis process.

6. The method according to claim 5, wherein additional fuel is supplied to the combustion process, in an amount corresponding to at the most 10% of the energy content of combustion process fuels originating in the pyrolysis process.

7. The method according to claim 1, wherein the fuel entering the pyrolysis process is dried with waste heat, such as heat from flue gas, low-pressure steam or product gas from pyrolysis process.

8. A pyrolysis apparatus, comprising a fluidized bed combustion furnace, means for fluidizing carrier material in the furnace, a pyrolyzer chamber, a flue gas channel exiting the furnace, a separator for separating carrier material from the flue gas channel and being located higher than the pyrolyzer chamber, and a connecting conduit between the separator and the pyrolyzer chamber for feeding carrier material by gravity to the pyrolyzer chamber, the apparatus further comprising a supply inlet for supplying fuel to be pyrolyzed to the pyrolyzer chamber, fluidizing gas supply means arranged in the pyrolyzer chamber for fluidizing a mixture of carrier material and fuel, and an outlet arranged in the upper part of the pyrolyzer chamber in connection with a space above the fluidized mixture of a carrier material and fuel for taking condensable gaseous substances that have separated from the fuel to be pyrolyzed out of the pyrolyzer chamber, and a condenser for condensing the condensable gaseous substances,
   the pyrolyzer chamber being bordered by the fluidized bed combustion furnace, being parallel to one wall of the furnace, and comprising a middle part and ends on both sides of the middle part, the connecting conduit for carrier material forming a carrier material inlet to the middle part of the pyrolyzer chamber, and the ends comprising carrier material return outlets to the fluidized bed combustion furnace, gas locks being provided by means of flow by gravity of said carrier material between the separator and the fluidized bed combustion furnace, said gas locks comprising:
   a first gas lock being located adjacent the carrier material inlet to said middle part of the pyrolyzer chamber and comprising an inlet for carrier material that is located in a lower position than an outlet for carrier material succeeding said inlet, and
   second gas locks being located at the ends of the pyrolyzer chamber and comprising inlets for carrier material that are located in a lower position than said carrier material return outlets succeeding said inlets.

9. The apparatus according to claim 8, wherein the flow path of the mixture of carrier material and fuel in the pyrolyzer chamber is transverse in relation to the flow direction of fluidizing gas caused by the supply means of fluidizing gas, and there are several sequential supply means for fluidizing gas along the flow path of the mixture.

10. The apparatus according to claim 9, wherein the pyrolyzer chamber comprises substantially a horizontal pyrolysis section having a bottom, supply means for fluidizing gas being arranged on the bottom and the outlet being arranged in the upper part.

11. The apparatus according to claim 8, wherein the pyrolyzer chamber comprises a pyrolysis section parallel to one wall of the fluidized bed combustion furnace, both ends of said pyrolysis section being connected to outlet chambers, which comprise said carrier material return outlets connected to the fluidized bed combustion furnace.

12. The apparatus according to claim 11, wherein the pyrolysis section and the outlet chambers are separated in the upper part of the pyrolyzer chamber by intermediate walls, allowing material enter the outlet sections from the pyrolysis section below the intermediate walls, the intermediate walls together with the carrier material return outlets forming said second gas locks.

* * * * *